(12) United States Patent
Inoue et al.

(10) Patent No.: US 6,888,329 B2
(45) Date of Patent: May 3, 2005

(54) CONTROL METHOD OF DYNAMO-ELECTRIC MACHINE FOR VEHICLE

(75) Inventors: Masaya Inoue, Tokyo (JP); Haruyuki Kometani, Tokyo (JP); Toshiyuki Yoshizawa, Tokyo (JP); Masahiko Fujita, Tokyo (JP); Tsunenobu Yamamoto, Tokyo (JP); Yoshihito Asao, Tokyo (JP); Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/458,188

(22) Filed: Jun. 11, 2003

(65) Prior Publication Data

US 2004/0080291 A1 Apr. 29, 2004

(30) Foreign Application Priority Data

Oct. 24, 2002 (JP) .................................. P2002-310023

(51) Int. Cl.$^7$ .............................. H02P 9/04; H02P 9/14; H02P 9/00; H02P 7/06
(52) U.S. Cl. ........................ 318/254; 318/154; 318/158; 290/31; 290/38 R; 290/46; 290/48
(58) Field of Search ............................. 290/17, 21, 24, 290/25, 34, 31, 38 R, 46–48, 10, 18, 22, 27, 28, 36 R, 38 C, 23, 29; 322/20–28, 44; 318/140, 157, 254, 158, 151–154

(56) References Cited

U.S. PATENT DOCUMENTS

| 3,890,548 | A | * | 6/1975 | Gray ........................... 318/139 |
| 4,616,166 | A | * | 10/1986 | Cooper et al. .............. 318/712 |
| 4,959,595 | A | * | 9/1990 | Nishimura ................... 318/138 |
| 5,493,200 | A | * | 2/1996 | Rozman et al. ............... 322/10 |
| 5,719,484 | A | * | 2/1998 | Taniguchi et al. ............ 322/20 |
| 5,739,677 | A | * | 4/1998 | Tsutsui et al. ................ 322/25 |
| 5,880,533 | A | * | 3/1999 | Arai et al. ..................... 290/31 |
| 6,118,247 | A | | 9/2000 | Obayashi et al. |
| 6,218,747 | B1 | * | 4/2001 | Tsuruhara ..................... 310/54 |
| 6,335,609 | B1 | * | 1/2002 | Amey et al. ................ 318/811 |
| 6,713,888 | B2 | * | 3/2004 | Kajiura ..................... 290/40 F |
| 6,806,687 | B2 | * | 10/2004 | Kajiura ........................ 322/16 |
| 2001/0019210 | A1 | * | 9/2001 | Fukasaku et al. ......... 290/40 C |
| 2002/0074803 | A1 | | 6/2002 | Kajiura |
| 2003/0030409 | A1 | * | 2/2003 | Kusumoto et al. .......... 318/801 |

* cited by examiner

Primary Examiner—David Martin
Assistant Examiner—Patrick Miller
(74) Attorney, Agent, or Firm—Sughrue Mion, PLLC

(57) ABSTRACT

A method of controlling an electric rotating machine for a vehicle includes an electric rotating machine (1) including a rotator having a field winding (5) and a stator having an armature winding (3), a field current controller (9) for controlling a field current supplied from a direct-current power supply to the field winding (5), and a power converter (6) for converting a direct-current power into an alternating-current power and applying the power to the armature winding (3). When the field current controller (9) starts to supply a current to the field winding (5) for starting an internal combustion engine, the power converter (6) supplies a power to the armature winding (3) so that magnetic flux in a direction opposite to that generated by the field winding (5) is generated simultaneously with or immediately before starting the power supply.

6 Claims, 4 Drawing Sheets

CONTROL METHOD OF DYNAMO-ELECTRIC MACHINE FOR VEHICLE

BACKGROUND OF THE INVENTION

1. Field of the Invention

The present invention relates to a control method of an electric rotating machine for vehicle installed in an internal combustion engine for vehicle and used as a generator and a motor.

2. Description of the Related Art

Hitherto, it has been proposed that a three-phase synchronous rotating machine is mounted on a vehicle and used as a charging generator in driving the vehicle as well as a starting motor in starting the internal combustion engine. Vehicles adopting idle stop, i.e., a function of stopping the internal combustion engine during stopping the vehicle in order to reduce exhaust gas, have been available recent years. In these vehicles, especially when the vehicle is stopping on the red light, it is necessary to complete restart of the internal combustion engine so that the vehicle is ready to start immediately upon receipt of a command to restart the internal combustion engine on the green light.

However, in a case where the electric rotating machine is used both as a charging generator and as a starter motor, a field winding of an electric rotating machine requires a large time constant as described later in order to satisfy the function as the charging generator. As a result, when such an electric rotating machine is used to perform a function as a motor, rise time of the field current is used to be long and it takes a long time to restart the internal combustion engine, and the vehicle cannot start smoothly. Means for solving such a problem is disclosed in such literatures as Patent Document 1 (the Japanese Patent Publication (unexamined) No. 2002-19158, page 4, FIG. 4) and Patent Document 2 (the Japanese Patent Publication (unexamined) No. 313498/1999 pages 3 to 7, FIGS. 7 and 8).

Patent Document 1 discloses an art in which when an internal combustion engine is started by a synchronous generator motor having a field winding and an armature winding, a power converter supplies the armature winding with an armature current having a current component that forms magnetic flux in the same direction as field flux generated by the field winding. Patent Document 2 discloses an art related to a synchronous motor for a hybrid car, in which delay in rising torque due to delay in rising field current is compensated by the steps of: detecting that the synchronous motor is in a transient state, i.e., the synchronous motor is not rotating at a constant speed during driving the synchronous motor; obtaining a current component for getting a magnetic flux whose component is coaxial with field flux on the basis of an output demand value; and controlling the armature current based on the obtained current component.

In the foregoing conventional arts, particularly in Patent Document 1, an electric current is applied to the armature (a stator) so as to generate magnetic flux in the same direction as the field flux (rotator flux). As a result, the iron core forming a magnetic circuit of a magnetic field is saturated, and self-inductance of the field winding is reduced. The time constant is decreased and the rise time of the field current is shortened, and responsiveness of the synchronous motor is improved. However, the synchronous machine controlled as described above still has problems as described below.

When electric supply is abruptly started so that magnetic flux is generated in the same direction as the field flux in the armature, an induced electromotive force is generated in the field winding in the direction to cancel the magnetic flux. Generally a control circuit for controlling the field current is provided with a semiconductor control device (numeral 301) as shown in FIG. 3 of Patent Document 1. The mentioned induced electromotive force is an electromotive force in a direction opposite to the current that is originally applied to the field winding. As the electromotive force reaches a relatively high voltage, it is necessary to increase withstand voltage of the semiconductor control element more than required. Moreover, in a case where a two-way device capable of applying a current bidirectionally is used as the semiconductor control element in order to control the counter electromotive force, a current flows in a direction opposite to the original field current. This brings about a bias resulting in delay of the rise time of the field flux.

To meet these problems, it may be an idea to start up the field current after the current applied to the armature has reached a predetermined value. In this case, however, the time for applying a power to the armature becomes longer. Hence a problem exists in that temperature rise occurs in the control circuit that controls the armature winding and application of current to the armature winding. Moreover, a synchronous machine for starting the internal combustion engine has been used. In this synchronous machine, field winding and permanent magnet are used together and a part of the magnetic flux of the permanent magnet is generated in a direction opposite to the main magnetic flux generated by the field winding in order to restrain magnetic saturation and leakage flux of the field winding. In the case of applying the mentioned conventional art to such a synchronous machine, it is essential to increase the current applied to the armature in order to saturate the magnetic circuit of the magnetic field. Since total sum of the field magnetomotive force is large particularly in the Randell-type multi-polar synchronous rotating machine, the temperature rise in the armature winding and the current control circuit is increased all the more.

SUMMARY OF THE INVENTION

The present invention was made to solve the above-discussed problems and has an object of obtaining a control method of an electric rotating machine for vehicle in which field flux rises speedily and startup time of the internal combustion engine is shortened without inviting any overvoltage of the control element and any sharp temperature rise in the armature winding as well as in the current control circuit.

A control method of an electric rotating machine for vehicle according to the invention includes an electric rotating machine comprised of a rotator having a field winding and a stator having an armature winding, field current control means for controlling a field current supplied from a direct-current power source to the field winding, and a power converter for converting a power of the direct-current power source into an alternating-current power and applying the electric power to the armature winding. In this control method, when the field current control means starts to supply a current to the field winding for starting an internal combustion engine, the power converter supplies a power to the armature winding so that a magnetic flux in a direction opposite to a field flux of the field winding is generated simultaneously with or immediately before starting the power supply from the field current control means to the field winding.

A control method of an electric rotating machine for vehicle according to the invention includes an electric rotating machine comprised of a rotator having a field winding and a stator having an armature winding, field current control means for controlling a field current supplied from a direct-current power source to the field winding, and a power converter comprised of a three-phase six-arm voltage-fed inverter for converting a power of the direct-current power source into an alternating-current power and applying the electric power to the armature winding. In the mentioned control method, when the field current control means starts to supply a current to the field winding for starting an internal combustion engine, the power supply to the field winding is carried out by conducting all of either upper arms or lower arms of the inverter to bring the armature winding into a short-circuited state.

As a result, self-inductance of the field winding is cancelled by mutual inductance of the field winding and the armature winding, and the field current rises swiftly when voltage is applied. It is possible to start speedily the internal combustion engine without inviting any generation of counter voltage and any temperature rise. Furthermore, the same advantages are performed in a synchronous machine in which a permanent magnet is used as a magnetic field together with a field winding.

DESCRIPTION OF THE PREFERRED EMBODIMENTS

Embodiment 1.

Figure 1:
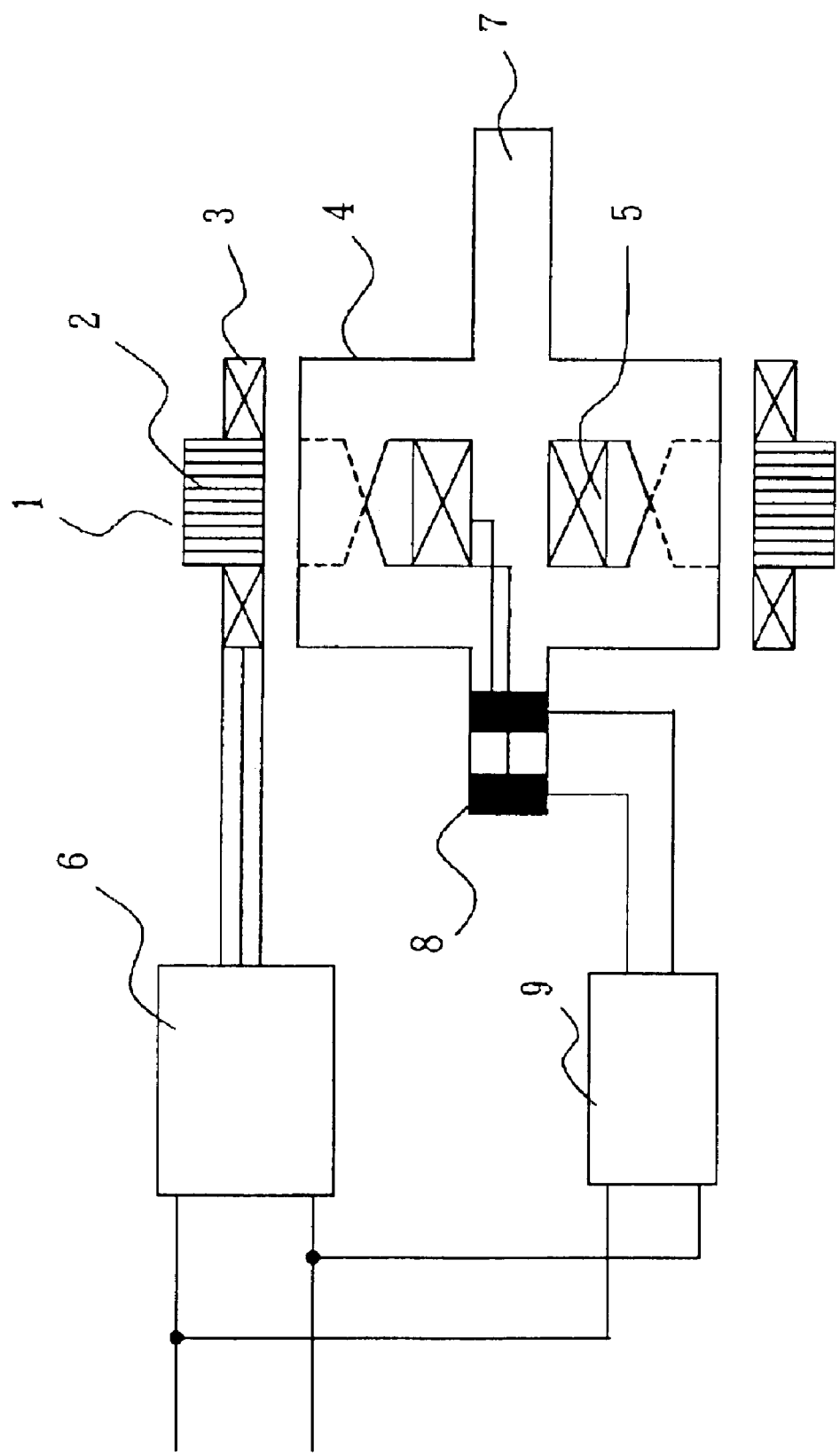
FIG. 1 is a schematic diagram for explaining an arrangement of a control method of an electric rotating machine for vehicle according to Embodiment 1 of the present invention.

FIG. 1 is a schematic diagram showing an arrangement of a control method of an electric rotating machine for vehicle according to Embodiment 1 of the invention. Referring to FIG. 1, an electric rotating machine 1 is comprised of an armature core (stator core) 2 having a three-phase armature winding (stator winding) 3 and a Randell-type multipolar rotator core (field core) 4 having a field winding (rotator winding) 5. When the electric rotating machine 1 functions as a motor, the electric rotating machine 1 is supplied with a power from a direct-current power source not shown in the drawing. Further, a power converter 6 functioning as an inverter supplies a three-phase alternating current to the armature winding 3, and the field winding 5 is supplied with a direct current from a field current control means 9 through a slip ring 8 disposed on a rotary shaft 7.

When the electric rotating machine 1 functions as a generator, the power converter 6 functions as a converter (rectifying means) and converts the three-phase alternating current generated by the electric rotating machine 1 into a direct current. The power converter 6 charges the direct-current power source not shown with a power, and the field current control means 9 controls an amount of power generation. When the electric rotating machine 1 functions as a motor, the field current control means 9 controls a field current establishing a predetermined direct current at every operating point as a target value. The invention relates to a starting characteristic at the time the electric rotating machine 1 functions as a motor. Now the function as a motor is hereinafter described.

The three-phase synchronous motor is defined by projecting it on d-q axes, which are orthogonal coordinates rotating synchronously with a rotator, and its operating state is expressed as being a composite vector of two components on the d-q axes. The description hereinafter will be given using these d-q axes, in which the d-axis indicates the center of a magnetic pole generated in a space between the rotator core 4 and the armature core 2 when the field winding 5 is supplied with a power, and the q-axis indicates a position where the phase is shifted 90° in electrical angle from the d-axis.

Figure 2:
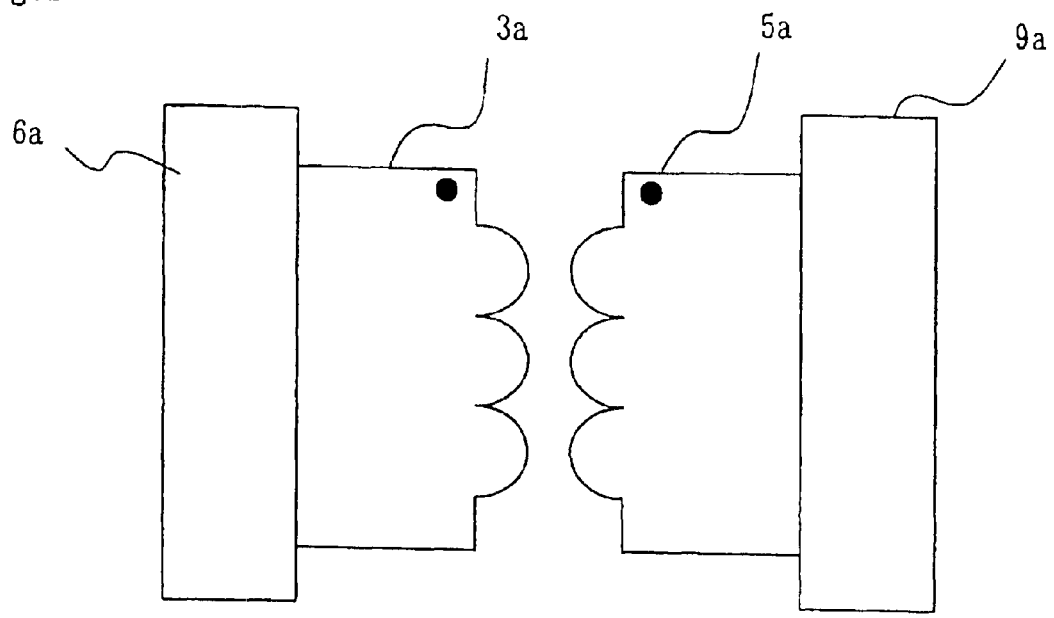
FIG. 2 is a diagram for explaining the control method of an electric rotating machine for vehicle according to Embodiment 1 of the invention.

FIG. 2 shows a relation between the armature (stator) and the magnetic field (rotator) on the d-axis in the form of an equivalent model. In the drawing, a power converter 6a functioning as an inverter, an armature winding 3a, a field winding 5a, and field current control means 9a functioning as a magnetic field power supply are respectively transformed into a d-axis equivalent circuit. In the following description, a plus d-axis current indicates an armature current flowing in a direction so as to generate a magnetic flux in the same direction as a magnetic flux generated when the current is applied to the field winding 5a in positive direction. A minus d-axis current indicates the armature current applied in reverse direction.

Generally in the electric rotating machine 1 constituted as shown in FIG. 1, multiwinding coil of thin wires is used as the field winding 5 to secure ampere turn for the purpose of reducing a current-carrying capacity of the slip ring 8 or reducing a current-carrying capacity of the field current control means 9. In the electric rotating machine 1 constituted as described above, torque is mainly generated by electromagnetic interaction between a q-axis current on the armature side and d-axis magnetic flux on the rotator side. In a case where the electric rotating machine constituted as described above is used to obtain an instantaneous reaction such as restart of the internal combustion engine being in idle stop, time constant of the field winding 5 is large to the extent of approximately 0.3 to 0.5 second. Therefore, rise time of the field flux is long, and it is not possible to immediately generate any torque.

To shorten the rise time of the field flux, it is possible to obtain instantaneous reaction by, for example, keeping the field flux raised at all times even when the internal combustion engine is stopped. However, supplying the field winding 5 with a power nearly to the limit at all times invites a considerable temperature rise in the field winding 5 and the field current control means 9. It is also possible to shorten the rise time of the field flux by applying preliminarily the plus d-axis current to the armature winding 3, magnetically saturating the magnetic circuit of the rotator preliminarily, and decreasing magnetic permeability of the rotator core 4 so that inductance of the field winding 5 is equivalently reduced, thus the time constant being small.

Figure 3:
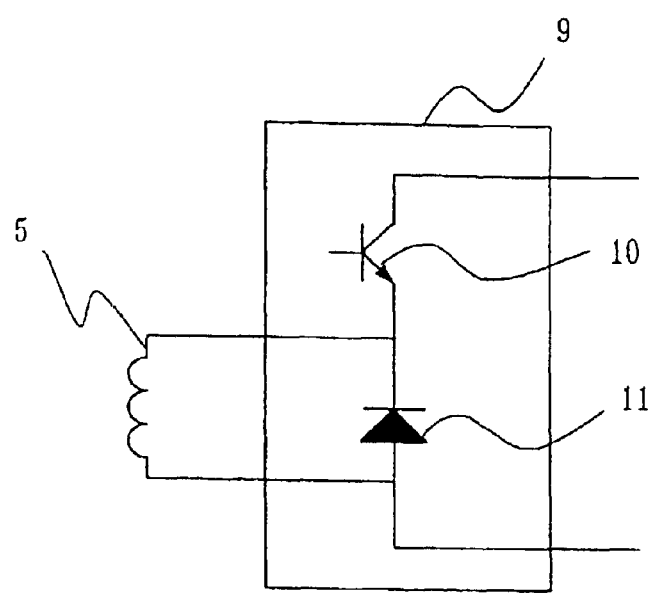
FIG. 3 is an explanatory diagram for explaining advantages obtained by the control method of an electric rotating machine for vehicle according to Embodiment 1 of the invention.

However, on the supposition of using a general current control circuit in combination of a semiconductor device 10 capable of applying a current only in one direction to the field current control means 9 and a diode 11 for protecting the semiconductor device as shown in FIG. 3, a high counter voltage is applied to both ends of the semiconductor device 10 and the diode 11 by counter electromotive force induced in the field winding 5. It is therefore necessary to increase the withstand voltage of the semiconductor device. Further, supposing that any recovery diode for protecting the semiconductor device is connected in parallel to the semiconductor device 10, the current in the field winding 5 flows in a direction opposite to the original excitation, and a minus bias is added. As a result, even when the semiconductor switch 10 is turned on, any delay occurs in the current in the positive direction.

It may be a further idea for shortening the rise time of the field flux to gradually apply preliminarily the plus d-axis current to the armature winding 3 before rise of the field current. In this case, a heavy current is applied to the armature winding 3 for a long time, and temperature rise in the armature winding 3 and the power converter 6 becomes large. To cope with this, in the electric rotating machine for vehicle according to Embodiment 1 of the invention, the following control is carried out.

In a case where the voltage applied to both ends of the field winding 5 is represented by Vf and the field current is represented by If, a relation between Vf and If is expressed as follows:

$$Vf=(Rf+pLf)If+pMId$$

where: p is a differential operator, Rf is a resistance of the field winding 5, Lf is a self-inductance of the field winding 5, M is a mutual inductance of the armature winding 3 and the field winding 5 on the d-axis, and Id is a current of the armature winding 3 on the d-axis.

Referring to the foregoing expression, when Id is controlled so as to be pLfIf=−pMId and the magnetic flux generated by If is cancelled by the magnetic flux generated by Id at all times, then the inductance is cancelled and the time constant is reduced, thus it is possible to control If speedily conforming to Vf.

Figure 4:
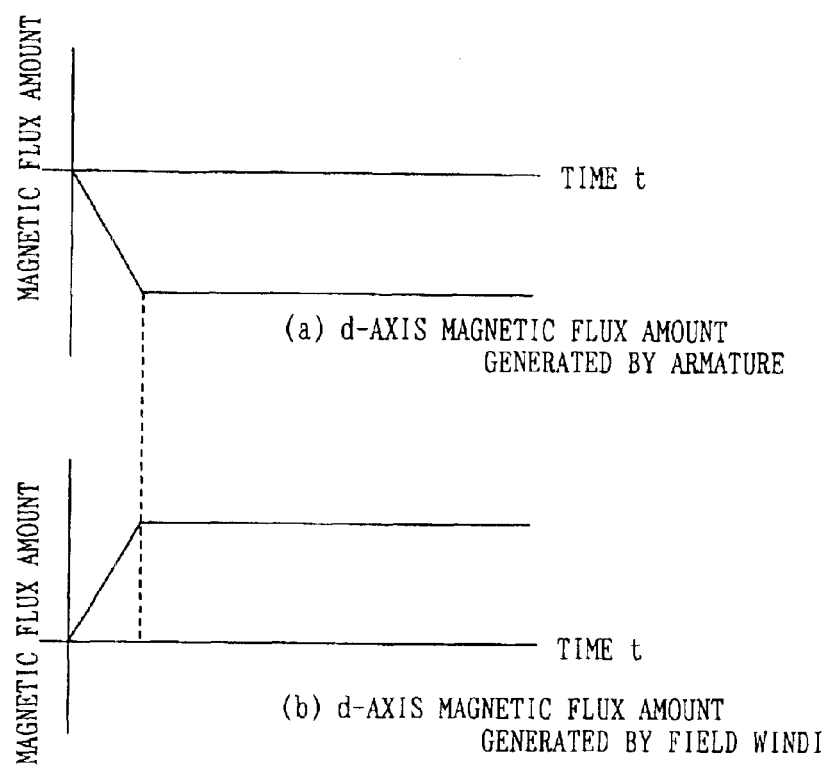
FIG. 4 is a characteristic diagram for explaining the control method of an electric rotating machine for vehicle according to Embodiment 1 of the invention.

FIG. 4 is a diagram for explaining this operation, and is a time chart showing current control amount of If and Id. In the drawing, (a) indicates an amount of d-axis magnetic flux in a space or void between the armature and the rotator generated by Id of the armature winding 3, and (b) indicates an amount of d-axis magnetic flux generated by If of the field winding 5. The current value is controlled so as to be pLfIf=−pMId in the drawing. Owing to such current control, it is possible to reduce interlinkage magnetic flux of both field winding 5 and armature winding 3 to a great degree, and it is possible to equivalently cancel the inductance and instantaneously start up the current.

Figure 5:
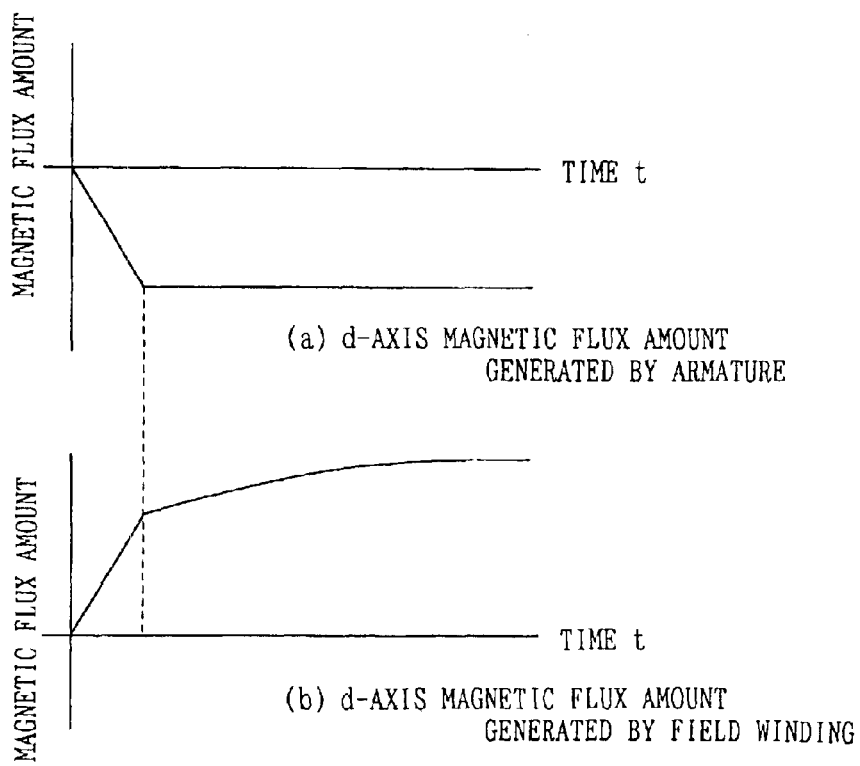
FIG. 5 is a characteristic diagram for explaining the control method of an electric rotating machine for vehicle according to Embodiment 1 of the invention.

In a case where it is necessary to control the current of the armature winding 3 in consideration of the capacity of the power converter 6 and others, the magnetic flux generated by the armature winding 3 and the magnetic flux generated by the field winding 5 are set up in a direction so as to cancel the inductance as described above, thus the magnetic field can rise speedily though halfway as shown in the characteristic chart of FIG. 5. Furthermore, supposing that the magnetic flux are out of conditions for being completely cancelled due to the limit of control speed, applying the minus d-axis current to the armature winding 3 acts as electromagnetic induction in a direction of speedily start up the current of the field winding 5. As a result, it is possible to obtain an advantage of suitably shortening the rise time of the field current of the field winding 5 and shortening the time for starting operation of the electric rotating machine 1 that acts as a starter motor. In addition, it is possible to smoothly start up the field current by establishing that the sum of the magnetic flux generated by the armature winding 3 and the magnetic flux generated by the field winding 5 is substantially constant.

Embodiment 2.

Figure 6:
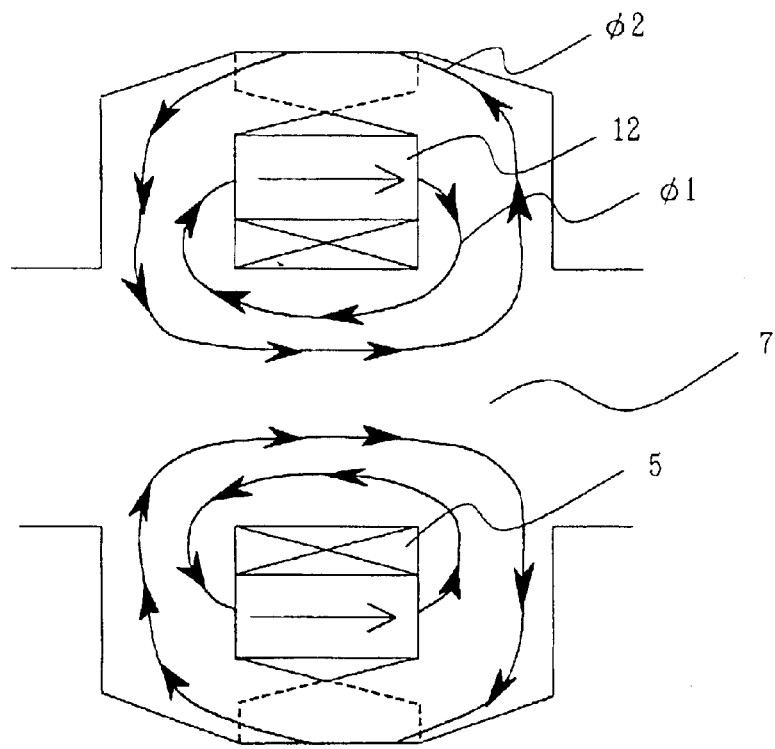
FIG. 6 is an explanatory diagram for explaining a control method of an electric rotating machine for vehicle according to Embodiment 2 of the invention.

FIG. 6 is a diagram of an essential part for explaining a control method of an electric rotating machine for vehicle according to Embodiment 2 of the invention. The electric rotating machine for vehicle in this embodiment, in which a field winding and a permanent magnet are used together as a magnetic field, intends to shorten the rise time of the field current. In the Randell-type synchronous rotating machine for vehicle having a multipolar structure as described in the foregoing Embodiment 1 referring to FIG. 1, a magnetic circuit is formed in which magnetic flux of every magnetic pole passes through the inner circumferential side of the field winding 5, i.e., the rotary shaft 7. As a result, a magnetic flux amount of the magnetic field is restricted by magnetic saturation of this rotary shaft 7, thereby output limit of the synchronous machine being established.

To expand this output limit, for example, as shown in FIG. 6, the field winding 5 and a permanent magnet 12 are disposed together in which magnetomotive force of the field winding 5 and that of the permanent magnet 12 are formed in the same direction. Thus, as shown in the drawing, a magnetic flux $\Phi1$ generated by the permanent magnet 12 and a d-axis magnetic flux $\Phi2$ generated by the field winding 5 are formed in the opposite direction at the central part of the rotary shaft 7, whereby it is possible to relax magnetic saturation at the central part of the rotary shaft 7. Various types of Randell-type synchronous machines in which the permanent magnet 12 and the field winding 5 are used together have been proposed recent years.

This constitution shows that it is difficult to saturate the d-axis magnetic circuit of the rotator. Therefore, when it is necessary to saturate the magnetic circuit in order to reduce the inductance and shorten the rise time of the filed current, it is difficult to generate magnetic saturation by applying the plus d-axis current to the armature winding 3. Without applying a heavy current to the armature winding 3, it is difficult to shorten the rise time of the field current with the use of magnetic saturation.

However, as described in the foregoing Embodiment 1, by controlling Id so that the magnetic flux generated by the current Id of the armature winding 3 on the d-axis always cancels the magnetic flux generated by the field current If and controlling the direction of the self-inductance Lf of the field winding 5 so that the self-inductance Lf is cancelled by the mutual inductance M on the d-axis of the field winding 5 and the armature winding 3, it is possible to shorten the rise time of the field current regardless of magnetic saturation of the magnetic field. As a result, it is possible to speedily restart the internal combustion engine also in an electric rotating machine in which the field winding 5 and the permanent magnet 12 are disposed together.

Embodiment 3.

The foregoing Embodiment 1 describes about a method of applying a current to the armature winding 3 on the d-axis. In this application of current, it is necessary to control position on the d-axis on the basis of information about position of the rotator. The Randell-type synchronous rotating machine has poles as much as ten to sixteen poles in general. Especially in a case where the machine has a multi-polar structure with sixteen poles, a detection error of 1 degree in mechanical angle corresponds to 8 degrees in electrical angle. This invites easily an error in phase-control angle, and it is sometimes difficult to completely cancel the magnetic flux depending on the control structure. To avoid such a situation, an angle detector of high precision of which resolution is not more than 1 degree is required. It is, however, essential to be extremely precise in mounting the angle detector capable of detecting absolute position in order to secure the resolution of not more than 1 degree. Especially in case of mounting a magnetic angle detector at a shaft end of the Randell-type synchronous rotating machine, leakage flux from the field winding 5 gives a great influence on the angle detector, and it is difficult to secure precision of 1 degree in mechanical angle in most case.

Figure 7:
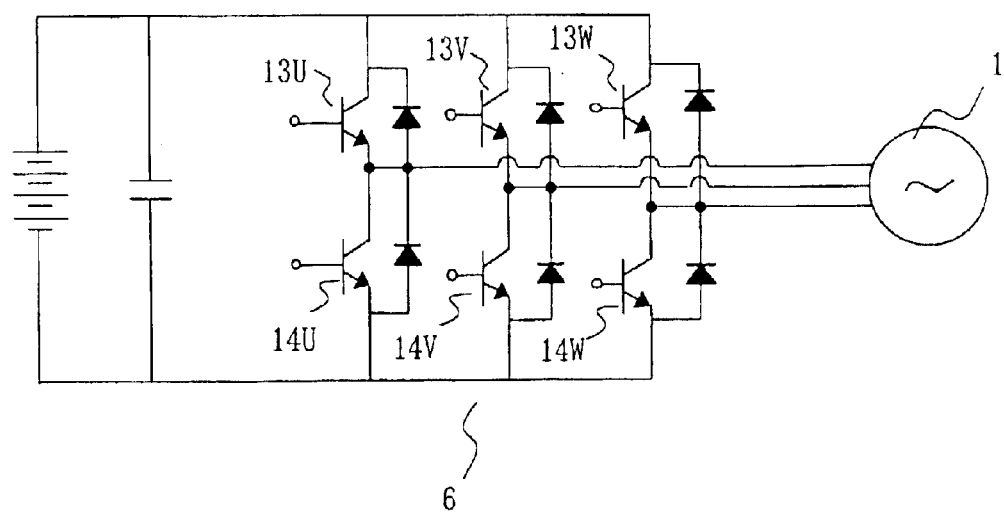
FIG. 7 is an explanatory diagram for explaining a control method of an electric rotating machine for vehicle according to Embodiment 3 of the invention.

This embodiment intends to propose a control method of the d-axis current without using any angle detector in such a delicate situation. In this control method, the armature winding 3 is supplied with power from the power converter 6 as shown in FIG. 1. Note that this power converter 6 is a three-phase inverter as show in FIG. 7, in which upper three arms are provided with switching elements 13u to 13w, and lower three arms are provided with switching elements 14u to 14w. When the internal combustion engine is restarted, first a field command based on a start command is issued. Upon starting the field current control means 9 to supply power to the field winding 5 following the field command, either all of the switching elements 14u to 14w of the lower arms of the power converter 6 or all of the switching elements 13u to 13w of the upper arms are turned on, thus the armature winding 3 is short-circuited in every phase.

Subsequently, either the field current detecting means detects the current of the field winding 5 or it is judged that the magnetic field has reached a predetermined target value on the basis of passage of a predetermined time. As a result, in the power converter 6, the mentioned on state of all the switching elements of either the upper arms or the lower arms is released to return the converter to its normal operation. At the same time, the power converter 6 is subject to PWM control to start application of current to the armature winding 3 so that the current comes to the same phase as that of the mentioned short-circuit current preliminarily detected.

As a result of controlling the application of current as described above, it is possible to control the d-axis current without using any magnetic field position detection information and computing means for computing a d-axis value of the current component. Thus it is possible to shorten the rise time of the field current. In other words, as the mentioned short-circuit current flows through the d-axis position, the inductance can be cancelled by applying a current of same phase as that of the short circuit current. Furthermore, since it is obvious that the short-circuit current flows through the d-axis position, it is possible to obtain information on the rotational position of the rotor without using any sensor by adding detection means capable of detecting at least two phases among the short-circuit current. In this manner, field flux control is achieved at a reasonable cost.

What is claimed is:

1. A method for controlling a dynamo-electric machine for a vehicle, said dynamo-electric machine comprising a rotator having a field winding and a stator having an armature winding, field current control means for controlling a field current supplied from a direct-current power source to said field winding, and a power converter for converting a power of said direct-current power source into an alternating-current power and supplying the alternating-current power to said armature winding, said method comprising:

when said field current control means starts to supply a current to said field winding for starting an internal combustion engine, supplying said alternating-current power by said power converter to said armature winding so that a magnetic flux in a direction opposite to a field flux of said field winding is generated simultaneously with or immediately before starting the supply of the current to said field winding.

2. The method for controlling a dynamo-electric machine for a vehicle according to claim 1, wherein at least one of said field current control means and said power converter controls a current value so that a sum of the field flux generated by said field winding at a central position of a magnetic field pole of said rotator and the magnetic flux generated by said armature winding is substantially constant.

3. The method for controlling a dynamo-electric machine for a vehicle according to claim 1, wherein at least one of said field current control means and said power converter controls a current value so that the field flux generated by said field winding at a central position of a magnetic field pole of said rotator is substantially equal to the magnetic flux generated by said armature winding.

4. The method for controlling a dynamo-electric machine for a vehicle according to claim 1, wherein a magnetic field generated by said field winding wound so that a rotary shaft serves as a magnetic circuit and a magnetic field generated by a permanent magnet are used together as a magnetic field of said rotator, and said permanent magnet is magnetized so that the field flux generated by said field winding and a field flux generated by said permanent magnet are in opposite direction with respect to said rotary shaft.

5. A method for controlling a dynamo-electric machine for a vehicle, said dynamo-electric machine comprising a rotator having a field winding and a stator having an armature winding, field current control means for controlling a field current supplied from a direct-current power source to said field winding, and a power converter including a three-phase six-arm voltage-fed inverter for converting a power of said direct-current power source into an alternating-current power and supplying the alternating-current power to said armature winding, said method comprising:

when said field current control means starts to supply a current to the field winding for starting an internal combustion engine, conducting all of either upper arms or lower arms of said three-phase six-arm voltage-fed inverter to bring said armature winding into a short-circuited state, to carry out power supply to the field winding.

6. The method for controlling a dynamo-electric machine for a vehicle according to claim 5, wherein when said armature winding is in the short-circuited state and at least one of the current of said field winding has reached a predetermined value and a predetermined time has passed from said field control means starting the current supply to said field winding, said three-phase six-arm voltage-fed inverter is released from the short-circuited state in which all of the upper or lower arms are conducted and supplies said armature winding with an armature current of the same phase as the current generated at the time of short-circuiting said armature winding.

* * * * *